(No Model.)
J. I. HARRIS.
PEN HOLDER.
No. 424,552. Patented Apr. 1, 1890.
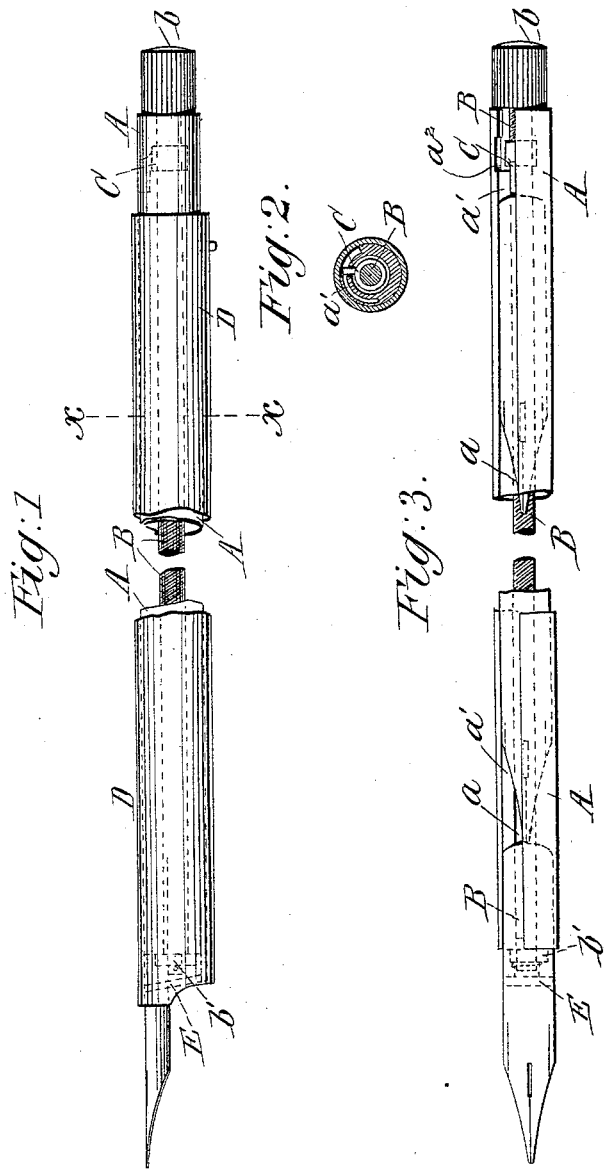
Witnesses.
J. Thomson Cross
Will. E. Rouzee
Inventor.
John Isidore Harris.
per Henry Orth
Attorney.

UNITED STATES PATENT OFFICE.

JOHN ISIDORE HARRIS, OF MELBOURNE, VICTORIA.

PEN-HOLDER.

SPECIFICATION forming part of Letters Patent No. 424,552, dated April 1, 1890.

Application filed March 26, 1889. Serial No. 304,809. (No model.) Patented in England September 29, 1888, No. 14,050; in France March 23, 1889, No. 196,929, and in Germany March 27, 1889, No. 48,489.

*To all whom it may concern:*

Be it known that I, JOHN ISIDORE HARRIS, gentleman, a subject of the Queen of Great Britain, residing at 8 Victoria Buildings, Queen Street, Melbourne, in the British Colony of Victoria, have invented new and useful Improvements in Pen-Holders, (for which I have obtained Letters Patent in Great Britain, dated September 29, 1888, No. 14,050; in France, dated March 23, 1889, No. 196,929; in Germany, dated March 27, 1889, No. 48,489, and for which I have filed applications for patents in the following British colonies, namely: Victoria, application filed on the 22d day of August, 1888, and numbered 6,096, that under the laws governing the grant of patents in said colony the Letters Patent will bear date as of the day of filing, and that up to the present time the patent on said application filed in said colony has not been granted; New South Wales, application filed on the 28th day of August, 1888, and numbered 905, that under the laws governing the grant of patents in said colony the Letters Patent will bear date as of the day of filing, and that up to the present time the patent on said application filed in said colony has not been granted; South Australia, application filed on the 29th day of August, 1888, but unnumbered, that under the laws governing the grant of patents in said colony the Letters Patent will bear date as of the day of filing, and that up to the present time the patent on said application filed in said colony has not been granted, and therefore the number thereof cannot be given, and New Zealand, application filed on the 6th day of September, 1888, and numbered 3,231, that under the laws governing the grant of patents in said colony the Letters Patent will bear date as of the day of filing, and that up to the present time the patent on said application filed in said colony has not been granted,) of which the following is a specification.

This invention of improvements in pen-holders has been devised for the purpose of providing means whereby the substitution of a new nib for an old or useless one will be rendered simpler and less objectionable than heretofore.

The essential feature of my invention is the combination, with a pen-holder adapted to contain a number of nibs placed one behind the other, of a suitable device whereby the said nibs may be pushed along the holder so that the end one will be forced out and the next one will be substituted therefor, and when that is worn out it also will be pushed out and the next one substituted for it.

Referring to the accompanying drawings, Figure 1 represents a side elevation, drawn to an enlarged scale, of so much of a pen-holder constructed according to my invention as is necessary to illustrate it. Fig. 2 is a transverse section on line $x\ x$, Fig. 1; and Fig. 3 is a similar view to Fig. 1, but with the outer casing of the pen-holder removed in order to better illustrate the construction and arrangement of said holder.

In constructing a pen-holder according to my invention I provide a suitable tube A, adapted to receive a small screw-threaded rod B. This rod extends from end to end of the tube A, and has at its upper end a small milled projection or knob $b$, whereby it may be rotated, while on its other end is secured a collar $b'$, whereby said rod is held in position within the tube A. A small carrier C is arranged to slide longitudinally in a slot $a$, formed in the tube A, and serves to convey the nibs along the tube. It is screw-threaded to receive the rod B, whereby it is operated. In practice five or six nibs are placed within the groove or channel $a'$ of the tube A, (the carrier C being drawn back out of the way in the recess $a^2$,) so that in order to change a nib it is only necessary to rotate the milled projection in the proper direction and to a sufficient degree to cause the carrier C to push against the rearmost nib in the holder and eject the lowermost one, substituting the next one therefor.

In order to protect my improved pen-holder from injury I inclose it in an outer casing or cover D, and I sometimes secure a protecting-piece E at the lower end, which by pressing closely against the under side of the nib in use prevents the ink from interfering with the working of the operating screw-threaded rod B.

Having now particularly described and ascertained the nature of my said invention and in what manner the same is to be performed, I declare that what I claim is—

1. In a pen-holder, a magazine constructed to hold a plurality of pens in a single row, in combination with a follower arranged at one end of the holder to operate on the last pen of the row, so as to move all the pens, and a pen-support at the opposite end of said holder arranged so as to form a narrow passage between it and the holder in the line or motion of the pens, substantially as and for the purposes specified.

2. The combination, in a pen-holder, of a tubular magazine constructed to hold a plurality of pens in a single row, a follower at one end of the magazine arranged to operate on the last pen of the row so as to move all the pens thereof, and a substantially semi-cylindrical pen-support so arranged at the opposite end of the magazine as to form a curvilinear slit in the line of motion of the pens, substantially as and for the purposes specified.

3. The combination, with a pen-holder, of a tubular magazine for the reception of a plurality of pens arranged singly and in successive order in said magazine, a support for the pens arranged axially within the magazine, and a follower operating on the last pen of the series and through the pens themselves upon the first of said series to move the pens along the magazine to the end of the holder, substantially as and for the purposes specified.

4. In a pen-holder, a tubular magazine slotted longitudinally and constructed to hold a plurality of pens in a single row, a follower at one end of the row, a pen-support at the opposite end of the row extending across the mouth of the magazine, so as to form a narrow slit for the passage of the pens, and an inclosing sheath or casing for and with which said magazine is detachably connected, substantially as and for the purposes specified.

5. In a pen-holder, a magazine consisting of a longitudinally-slotted tube, a support arranged axially within said tube and relatively thereto, so as to hold the pens therein in a single row, a follower mounted on the support and operating upon the last pen of the row to feed the series of pens, and a pen-rest extending across the mouth of the tube to form a narrow slit for the passage of the pens, in combination with an inclosing casing or sheath, substantially as and for the purposes specified.

6. A pen-holder consisting of the open-ended and longitudinally-slotted tube A, provided at one end with a bearing $b'$, of the screw-threaded rod B, revoluble in said bearing and having at its other end a milled head $b$, the follower C, provided with an interiorly-threaded bearing through which the rod passes, and the inclosing sheath or casing D, substantially as and for the purposes specified.

7. A pen-holder consisting of the open-ended and longitudinally-slotted tube A, provided at one end with a bearing $b'$, of the screw-threaded rod B, revoluble in said bearing and having at its other end a milled head $b$, the follower C, provided with an interiorly-threaded bearing through which the rod passes, the inclosing sheath or casing D, and the pen-rest E, secured to the end of the holder-tube A and constructed to close said end, substantially as and for the purposes specified.

JOHN ISIDORE HARRIS.

Witnesses:
WALTER CHARLES HART,
PERCIVAL AUGUSTUS SMITH.